3,796,814
HEAT-SENSITIVE CONDIMENT-CONTAINING FATTY PARTICULATE
Robert E. Cermak, Chicago, Ill., assignor to
SCM Corporation, Cleveland, Ohio
No Drawing. Continuation-in-part of application Ser. No. 797,236, Feb. 6, 1969, now Patent No. 3,647,480. This application Nov. 15, 1971, Ser. No. 198,964
The portion of the term of the patent subsequent to Mar. 7, 1989, has been disclaimed
Int. Cl. A23l 1/26
U.S. Cl. 426—98         3 Claims

ABSTRACT OF THE DISCLOSURE

Condiment-containing fatty particulates with a substantially continuous fatty matrix phase at the surface. The composite particles are prepared by contacting a heat-sensitve condiment with preformed fatty matrix particles at a temperature not substantially above the Wiley melting point of the matrix particles for a time sufficient for the condiment to be absorbed. Agglomerates of the composite particles can be formed.

---

This application is a continuation-in-part of my earlier copending application having U.S. Pat. No. 3,647,480 and a filing date of Feb. 6, 1969. The contents of said copending application are hereby incorporated by reference.

Fatty particulates containing condiment are known and have been used in the past for making bakery products, as well as other types of edible foods. Generally, the practice in making such fatty particulates containing condiment has been to melt the fatty matrix to a liquid, disperse the condiment therein, whether it be a liquid or solid, cool the molten fat until it solidifies, and then chip the solidified fat and condiments forming particulates usually about ¼ inch at the widest dimension. These chips then could be incorporated into a dough or shortening for forming bakery products or sprinkled over hot bakery products; e.g., rolls, cookies, etc. Such edible products possessed localized areas containing an enhanced portion of spice or colorant.

One of the advantages of this type of product is that the fat can be selected on the basis of its melting point for providing controlled release during baking of the condiment, bacteriastat, colorant, etc. Another is that the condiment could be protected from moisture air where such caused degradation or oxidation.

Advantages of the product of this invention over those of the prior art are that it includes the ability to avoid heat in the manufacture of the fatty particulate containing condiment which is particularly important especially where heat-sensitive condiment and flavorants are used. Products prepared by techniques requiring heat obviously have different organoleptic properties from those not requiring heat when such products contain heat-sensitive spices, colorants, etc.

The improved product comprises a heat sensitive condiment and a fatty matrix, the fatty particulate containing condiment being prepared by contacting said condiment in a zone with preformed fatty matrix particles at a temperature and for a time sufficient for making discrete composite particles of said matrix particles and said condiment with a substantially continuous fatty matrix phase at the surface of said composite particle and without substantial uncontrolled agglomeration of either said matrix particles or the resulting composite particle. The temperature of said matrix particles and said composite particles being their bulk temperature and not substantially above the Wiley Melting Point of said matrix particle, the holding time in said zone being an average holding time and being at least about one second.

The condiment for purposes of this invention, can be any heat-sensitive liquid or solid phase seasoning ingredient suitable for producing or enhancing a flavor and/or a colorant for edible products. The condiment includes solid condiment, flavoring oils, essences, extracts, and other zesty flavorings. By "heat sensitive," it is meant to refer to those condiments; e.g., flavorings or colorants used as a seasoning in making food products which are susceptible to organoleptic degradation at temperatures in excess of about 120° F. at atmospheric pressure. There are many examples of heat-sensitive condiments either in solid or liquid form, and they include the imitation fruit flavors; e.g., lemon, lime, strawberry, raspberry, apple, cherry, peach, pear, blueberry, and so forth. Also oleo resin of paprika, cinnamon, anis seed or oil, natural cranberry, imitation flavorants or colorants containing acetaldehydes, cinnamaldehyde, caprylic aldehyde, and lower alkanols. These composition, when exposed to temperatures of 120° F. tend to undergo degradation often because some of the more volatile components in the flavors evaporate during the manufacturing process. Some undergo a color change. Paprika, when exposed to high temperatures; e.g., above 120° F., for a period of time, has the tendency to discolor to a brownish color as opposed to its normal reddish color.

The heat-sensitive condiment or condiment mixture employed preferably, is enrobed by the fatty matrix so as to substantially encapsulate it and protect it from the environments contaminating ingredients. If the condiment is appended to the surface as might be with the product in my copending application, it may not be protected and therefore, may undergo degradation.

By a fatty matrix particle is meant an ostensibly solid (nonsticky to and not readily deformed by touch at room temperature of 75° F.) small particle of fatty material such as one of a triglyceride fat, fatty acid, fatty emulsifier or surface active agent, fatty alcohol, wax such as beeswax or paraffin, or a mixture of same, suitably of edible quality for culinary or cosmetic purposes and capable of being preformed into small matric particles which remain substantially discrete from each other and readily pourable at room temperature (75° F.) from a conventional 100 ml. beaker which has been loosely filled at such temperature with the matrix particles in uncompressed bulk condition.

The fatty matrix particle can be preformed into the shape of a bead, flake, a chip, a cut or multifaceted form, a granule, an irregular solid particle, or the like. It can be colored and/or flavored or otherwise compounded conventionally, substantially homogeneously, if desired or neccessary. Fundamentally, the composition of the matrix particle should be of a composition distinguishable from the condiment composition applied to it, enrobed by it, or sorbed into it.

Materials which can be included as a fraction (ordinarily a minor fraction) of the fatty matrix particle include emulsifying materials such as those shown hereinabove, fungistats, bacteriastats, silicone oil, tints, dyes, colorants, flavorants, odorants, and antioxidants. When incorporating such materials into the matrix particle, they are generally proportioned in useful ratios for their end purposes. Thus, for example, one can use in a typical formulation 0.1 to 30% (by weight of the matrix particle) of conventional emulsifiers and stabilizers; colorants are useful in about the same proportion to yield the desired color in the resulting particle or in the end product to which it is to be added.

For broad utility, the matrix particle advantageously is a fat. The fat can be any neutral edible triglyceride or mixture of triglycerides such as one having a Wiley Melting Point below about 200° F., preferably below about 165° F., and generally at least about 100° F., preferably at least about 120° F. A fatty core particle such as fat in straight or compounded form should have a melting point sufficiently high so that conventionally-made beads thereof (from a spray chilling operation and passing a sieve from about 30 mesh and retained on a 60 mesh U.S. Standard Sieve) will be substantially resistant to uncontrolled agglomeration (not over 25% of its weight agglomerated into multiparticle aggregates) when standing at 85° F. in unpacked, loosely loaded condition in a conventional 100 ml. beaker. This can be termed a fatty matrix particle of minimum hardness for our purposes.

Vegetable fats (including nut fats) and animal fats or mixed vegetable and animal fats, generally hydrogenated and often rearranged, are suitable for making the matrix particle. Typical vegetable oils which can be hydrogenated for this purpose are cottonseed, corn, peanut, soybean, palm kernel, babassu, olive, and safflower; various useful animal fats include hydrogenated and unhydrogenated fats or fat fractions derived from hogs, cattle, and sheep including lard, oleostock, oleostearin, and tallow. Among the most desirable fats here are the so-called "confectioners' hard butters" because of their desirable mouthing characteristics.

By a "hard butter," is meant a broad class of triglycerides having physical properties and performance properties permitting their use in confectioners' coatings as a replacement for cocoa butter. Suitable hard butters should have a Wiley Melting Point between about 90° F. and about 120° F., and should diminish fairly sharply in their ratio of solid to liquid fraction at a temperature of about 75° F. or higher, preferably at about mouth temperature. An example of especially useful hard butter is one derived from hydrogenated palm kernel oil.

Fats or fat-containing mixtures used as a matrix material should be substantially hard. We have found that quite desirable fats have a high (at least about 50%) total solids content at room temperature (75° F.). Fats which are unduly plastic at this temperature can form uncontrolled and, therefore, undesirable agglomerates on blending or in storage. A preferred fatty matrix particle has a Solid Fat Index of 75–82% total solids at 80° F., 70–76% total solids at 92° F., and 58–64% total solids at 100° F. Such fat in conventionally beaded condition is not unduly plastic at room temperature and fuse or otherwise form a substantial fraction of uncontrolled and undesirable agglomerates. The Solid Fat Index is the test as described in the Official and Tentative Methods of the American Oil Chemist's Society coded CD 10–57, corrected in 1961.

To resist rancidity of the resulting condiment-containing particulate, we prefer to use a fat (and any added plasticizing oil which remains as a residue on or in the fatty matrix) having an AOM stability of at least 100 hours. "AOM stability" stands for the active oxygen method described in the Official and Tentative Methods of the American Oil Chemist's Society, CD 1257, revised 1959. The matrix particle and/or plasticizing oil can, of course, have antioxidants (BHT, BHA, etc.) butylated hydroxytoluene and butylated hydroxyanisole, included in it in amounts for assisting to resist rancidity.

It is often desirable to select fatty matrix particles by their Wiley Melting Points, especially when the product is to be used in producing baked goods. Advantageously, the fatty substance of the matrix has a Wiley Melting Point of at least about 100° F., and preferably of at least about 120° F. to 130° F.

By judicious selection of such melting point, the temperature for release of the condiment in or on the baked goods can be regulated. For example, a condiment having fungistatic or fungicidal action is sorbed into or enrobed by a fatty matrix having a high melting point; it can be made to delay its release from the matrix during a dough processing cycle until after useful action of yeast for proofing or the like has taken place, typically at a temperature lower than such melting point.

The weight ratio of condiment to fatty matrix can be regulated within reasonably broad limits to produce the culinary, aesthetic, organoleptic, and/or handling effect or property desired in the final product. In instances where relatively little fatty matrix is necessary or desirable in the finished particulate, one can use as much as about 65 to 75% condiment by weight of such resulting product. At the other end of the scale, the portion of condiment incorporated is substantially less. The amount of condiment incorporated is dependent to a large extent on the strength of the condiment for its desired effect. A mild one has little organoleptic effect when used at a proportion of substantially less than about 5% by weight of the resulting product. A potent one such as one containing oil of capsicum can be useful in proportions even as low as a fraction of 1%; e.g., 0.01%.

The matrix particle surface often is desirably plasticized for use in this process. Suitably this can be done by adding an edible oil or solvent to the solids in process, such oil or solvent being liquid at room temperature, residual and edible or substantially fugitive on standing in the open at room temperature for 10 days or less, and fat soluble. A typically useful plasticizing oil is a fat of vegetable or animal origin, optionally partially hydrogenated, and derived suitably from oils such as soybean, peanut, corn, sesame, olive, cottonseed, coconut, palm kernel, safflower, or a mixture of same. Preferred oils of high stability (oxidation resistance) are partially hydrogenated and rearranged, then recovered as a selected fraction by solvent fractionation of the resulting mixture. Other plasticizing ingredients include similarly liquid phase fatty emulsifiers or solutions of same as partial glycerides, polyglycerol esters, etc., and various oil edible mixtures or even substantially fugitive (or standing or mild heating) such as lower molecular weight, normally liquid phase ketones, aldehydes, esters, alcohols, or the like. These rarely need to be added to the operation in a proportion greater than about 10% by weight of the fatty core particles and generally are used at about 0.05% to 2%.

In practicing the invention, the matrix particle is preformed prior to its blending with the condiment or condiment mixture. Preferably, for efficiency and economy, the preforming operation is accomplished by spray chilling the molten fatty substance or mixture to form a bead. Other useful preforming methods include for example: extruding through a warm die and cutting off the extruded sections into small pieces, then cooling; comminuting by grinding or chipping a solid, optionally then classifying the resulting comminuted material; flaking from a chilled roll; and forming a ribbon by a chilled roll and slicing the ribbon into flakes. A beaded matrix is substantially spherical. However, the shape is not critical and the matrix particle can be in the form of a diamond, hexagon, an irregular chip or granule, a square, etc., any or all with full or open centers. Generally, the advantageous size of the beaded matrix particle is such that it will pass a 5 mesh and be retained on an 80 mesh (U.S. Standard Sieve), and preferably the effective size range is between about 30 and about 60 mesh. Flakes or granules ordinarily are no larger than about ⅜" in their largest dimension, but can be made larger or smaller if necessary or desirable.

Generally and preferably, we form the condiment-containing particulate by intimately contacting the condiment with the preformed fatty matrix particles at a temperature below the Wiley Melting Point of such matrix particles for efficiency and economy. If a plurality of matrix particles of different Wiley Melting Points are used, then the lowest of such melting points is the limiting one on the preferred contacting operation. A solid phase condiment, when in extremely finely divided form (all passing a 150 mesh U.S. Standard Sieve, typically with at least about 95% by weight being retained on the 325 mesh screen), yields a discrete composite particle with the condiment sorbed into or onto the matrix particle. We can also use a coarse particulate product (between 16 and 20 mesh, U.S. Standard Sieve), and when intimately contacted with smaller plasticized matrix particles, yields a discrete composite particle with the fat enrobed about the condiment.

The matrix particle and condiment mixture can be efficiently contacted by blending in conventional blending equipment. Equipment suitable for blending liquid phase or solid phase condiment with the matrix particle includes: ribbon blenders or mixers, tumbling barrels, double cone mixers, mushroom mixers, and pan mixers. For efficiency and economy of operation and cleaning, we prefer to use a double-motion paddle mixer (bakers type). Vapor phase or entrained liquid phase droplets or fog of condiment can be blended with the matrix particles by fluidized or moving bed techniques, for example where the matrix particles make up the bed and the condiment is carried upwardly therethrough in a non-condensible gas stream such as air or nitrogen, which can be recirculated. Blending times of at least a second, advantageously at least a minute, and preferably 5-15 minutes, are used to promote efficient union of the feeds and obtention of the desired particles.

A typical contacting or blending operation is done at about room temperature for efficiency and economy. However, the contacting operation can be conducted at substantially lower temperatures or even at somewhat higher temperatures for a limited time where necessary or desirable so long as formation of discrete composite particles occurs without substantial uncontrolled agglomeration (about a maximum of 25% of the mass by weight) of the matrix particles or resulting particles one to another. Agglomeration is suppressed by contacting the matrix particles and condiment particles in a sorption zone at a bulk temperature not exceeding the Wiley Melting Point of the matrix particles and an average holding time of at least about a second. The bulk temperature is measured by grabbing at random, a sample from the contacting zone and measuring its highest temperature with an ordinary glass laboratory thermometer. If the contacting operation is batch, the average holding time will be the mixing time. If the operation is continuous, it is the quotient of the bulk volume of particles in the contacting zone divided by the volumetric feed rate of the matrix particles and other solid feed particles.

We can also produce in such sorption zone controlled agglomeration of the small particles of resulting composite product. Agglomerates are quite desirable for some uses. Thus, by careful and judicious elevation of the temperature coupled with the intensive mixing, controlled agglomeration yielding agglomerates of a predetermined size or size range can be done. The mixture, then, can be classified as to size and the undersized returned to the agglomerating operation. However, because of the delicacy of control and frequently structural weakness of such agglomerate, we prefer to use other methods. The agglomerate can appear to be a cluster of particles joined together like a raspberry, or it can appear to be in a lump like a coin or an annulus. An example where an agglomerate is preferred over a smaller composite particle is in the instance where sensational gross "hot spots" of flavor concentration are desired in a baked product such as a biscuit, or where significant surface or internal color concentrations are desired in the product. Agglomerates containing food colorant are useful when scattered to produce a gross speckled effect, whereas the smaller discrete particulate product produces slight color centers of the same or varigated colors which are less conspicuous, but can be dispersed more widely. A baked product where conspicuous color spots might be desired is a pizza surface. By forming the agglomerate into a selected shape, for example a Roman capital letter D, an O-ring, a trademark shape, or the like, it is easy to customize the agglomerate for selective markets.

When these agglomerates are used, for example in producing cooked or baked goods, special agglomerates desirably shaped can be made to appear as a fossil-like imprint in or on the product when the fatty matrix material dissipates.

The agglomerate can be made from the same kind of condiment-containing composite particles or a mixture of different sorts of such particles to obtain a combined organoleptic effect, a fore-shortened or a protracted melting range, a monochromatic or polychromatic coloring effect, or the like.

Advantageously, the agglomerates are produced in a postforming operation (after the contacting operation) by uniting a plurality of the smaller particulates containing the condiment into an interlocked or "sintered mass" suitable for handling by operations utilizing pressure, heat, and/or an edible or innocuous binding agent. Such binding agent can be substantially fugitive, residual, adhesive, even a simple fatty bead or paste which causes a group of the discrete composite particles to adhere to one another in a briquetting, pelletizing, tableting, or coining operation. In such operations, a quantity of the composite particles can be compressed in a mold, extruded from a die, and cut into sections, optionally with additional postforming of the molded or cutoff sections to a desired shape.

In one form of pelletizing, the material is pressed through a perforated die and the resulting extruded material is cut transversely to its flow direction into a plurality of small pellets as the flow emerges from the die. Edible binders, such as wheat flour paste, plain fatty particles, or plastic fats, edible gums, gelling solutions such as aqueous gelatin, etc. and even fugitive normally liquid phase solvents such as lower molecular weight ketones, esters, aldehydes, and alcohols; e.g., acetone or ethanol, or even water in some cases, can be used where necessary or desirable in minor and usually very minute effective proportions for uniting a plurality of the finer particulates or the small particulates can be joined by rolling or tumbling together.

For best control of the agglomerating operation, it is done separately from the contacting operation. For efficiency and economy, we prefer to agglomerate by the use of a briquetting, tableting, or pelletizing technique without any additive, or with such additive in a very restricted amount so as to reduce or eliminate an after-treating operation such as drying or substantial chilling.

The temperature of the agglomeration operation is generally restricted to that well below the temperature at which the fatty matrix particle will melt and run; e.g., the Wiley Melting Point, although somewhat higher temperatures than the Wiley Melting Point (10° to 15° F.) can be used for short periods of time for achieving a sintering-like effect. However, particularly where the condiment can stand the temperature, complete fusion or melting and subsequent rehardening of the fatty matrix material within a particular agglomerate structure during an agglomeration operation is permissible.

The product produced from the agglomerating action can be of any convenient and useful size for handling and/or for the effect desired with the end product. Generally, such agglomerate is no larger than about an inch in its largest dimension.

When producing either the small particulate form or the agglomerate form, we can and often do dust with or otherwise apply to the surface of the final product a flow-promoting agent such as an efflorescent salt to enhance the free-flowing properties of the product. Certain products such as those containing a high proportion of table salt have improved flow and dispersibility into most cooking ingredients when so treated. Typical flow-promoting agents include magnesium phosphate, tricalcium phosphate, sodium aluminum silicate, fine particle silica, and calcium carbonate, all generally in extremely finely divided condition.

The following examples illustrate preferred embodiments the invention, but should not be construed as limiting it. In this application, all parts are parts by weight, all percentages are weight percentages, and all temperatures are in degrees Fahrenheit, unless otherwise specified.

EXAMPLE I

A fatty particulate containing an imitation fruit flavors; i.e. strawberry, is prepared as follows: 35 parts beaded hard butter particles, 10 part imitation strawberry in powdered form, and 0.2 part of a plasticizing fat-soluble edible oil are blended in a conventional double-motion paddle mixer (bakers' type) at room temperature (75° F.) and at atmospheric pressure for about 10 minutes. The beaded hard butter particles are preformed by spray chilling molten fat to a particle size of between about 30 to 60 mesh (U.S. Standard Sieve). The hard butter has a Wiley Melting Point of 120–121° F., a Solid Fat Index of 58–64% total solids at 100° F., 70–76% total solids at 92° F., and 75–82% total solids at 80° F. The plasticizing oil is made from refined and rearranged domestic vegetable oils, namely soybean and cottonseed, has a Wiley Melting Point of 63° F.±4° F., an Iodine Value between 74 and 81, and a Solid Fat Index of 3% total solids at 70° F. The plasticizing oil and heat generated in the sorption zone of the mixer by agitation softens the beaded hard butter matrix particulates to allow the fat to sorb and enrobe the imitation strawberry flavor. The temperature, holding time, speed of mixing, and proportion of plasticizing oil used interacting and can be controlled to suppress the formation of large agglomerates in the soption zone; until virtually nil. Discrete composite particles comprising the strawberry flavor and hard butter are produced in about 10 minutes. About 1% ultrafine powdered silicon dioxide then is blended with the discrete product for a few minutes to render the product substantially free flowing. The resulting discrete particles are beads, the vast preponderance of which are between about 10–20 mesh (U.S. Standard Sieve).

EXAMPLE II

The above product from Example I is applied to the top of a hot vanilla cookie wafer. The fat melts and flows into the cookie surface and releases the flavorant providing for excellent taste.

EXAMPLE III

A cinnamon-containing fatty particulate is produced by blending in the mixer of Example I at 70° F. and at atmospheric pressure 74 parts of beaded hard butter and 10 parts of cinnamon (ground) and 10 parts butter flavor for one minute, then adding 25 parts of very finely divided cinnamon powder and continuing to blend for 9 minutes. The beaded hard butter is the same as that described in Example I.

On blending, the finely divided cinnamon is sorbed into the matrix of hard butter, forming a discrete composite particle of cinnamon and hard butter.

The discrete particle then can be applied from a dispersion to a piece of toast just from the oven. The toast possesses the characteristic butter cinnamon flavor.

What is claimed is:

1. Condiment-containing fatty particulates for use in baking processes produced by contacting condiment in a zone with preformed fatty matrix particles at a temperature and for a time sufficient for making discrete composite particles of said matrix particles and said condiment, with a substantially continuous fatty matrix phase at the surface of said composite particle, and without substantially uncontrolled agglomeration with said matrix particles or the resulting composite particles, the temperature of said matrix particles and said composite particles in said zone during the production being the bulk temperature and being not substantially above the Wiley melting point of said matrix particles, the condiment-containing fatty particulate comprising:

discrete composite particles of preformed fatty matrix particles and condiment particles;

said composition particles having a substantially continuous fatty matrix phase at the surface of said composite particle;

said condiment being absorbed into said fatty matrix phase and having an organoleptic decomposition temperature greater than 120° F.;

said fatty matrix being ostensibly solid at room temperature and having a Wiley melting point from about 120° F. to 200° F. whereby said heat-sensitive condiment-containing fatty particulate is adapted for releasing of the condiment at baking temperatures in producing baked goods.

2. The product in claim 1 wherein said fatty matrix is plasticized at the surface of said composite particle.

3. The product in claim 1 wherein the composite particles are agglomerated.

References Cited

UNITED STATES PATENTS

| | | | |
|---|---|---|---|
| 3,647,480 | 3/1972 | Cermak | 99—140 R |
| 1,829,431 | 10/1931 | Allen | 99—140 R |
| 2,785,983 | 3/1957 | McMath | 99—140 R |
| 3,389,000 | 6/1968 | Fujita et al. | 99—140 |
| 3,261,692 | 7/1966 | Chang et al. | 99—166 |
| 2,278,466 | 4/1942 | Musher | 99—123 |
| 3,476,572 | 11/1969 | Dros et al. | 99—143 |

FOREIGN PATENTS

| | | | |
|---|---|---|---|
| 821,995 | 10/1959 | Great Britain | 99—118 P |

MORRIS O. WOLK, Primary Examiner

S. B. DAVIS, Assistant Examiner

U.S. Cl. X.R.

426—147, 221

PO-1050
(5/69)

UNITED STATES PATENT OFFICE
CERTIFICATE OF CORRECTION

Patent No. 3,796,814　　　　　　　　　Dated March 12, 1974

Inventor(s) Robert E. Cermak

It is certified that error appears in the above-identified patent and that said Letters Patent are hereby corrected as shown below:

Column 2, line 42, delete "matric" and insert ---matrix---;

Column 7, line 8, delete "flavors" and insert ---flavor---;

line 31, delete "soption" and insert ---sorption---;

Column 8, line 21, delete "composition" and insert ---composite---.

Signed and sealed this 3rd day of December 1974.

(SEAL)
Attest:

McCOY M. GIBSON JR.
Attesting Officer

C. MARSHALL DANN
Commissioner of Patents